US009107282B2

(12) United States Patent
Twarog

(10) Patent No.: US 9,107,282 B2
(45) Date of Patent: Aug. 11, 2015

(54) ASYMMETRIC CONSUMABLES FOR A PLASMA ARC TORCH

(75) Inventor: Peter Twarog, West Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 276 days.

(21) Appl. No.: 13/567,260

(22) Filed: Aug. 6, 2012

(65) Prior Publication Data

US 2014/0034618 A1 Feb. 6, 2014

(51) Int. Cl.
*B23K 10/00* (2006.01)
*H05H 1/34* (2006.01)

(52) U.S. Cl.
CPC ......... *H05H 1/34* (2013.01); *H05H 2001/3463* (2013.01); *Y10T 29/49778* (2015.01)

(58) Field of Classification Search
CPC ............. H05H 1/26; H05H 1/32; H05H 1/34; H05H 1/38; B23K 10/00; B23K 9/02
USPC ......... 219/121.5, 121.51, 121.48, 121.55, 74, 219/75, 137 R, 137.42
See application file for complete search history.

(56) References Cited

U.S. PATENT DOCUMENTS

| | | | | |
|---|---|---|---|---|
| 3,707,615 | A | 12/1972 | Rotolico et al. | |
| 3,740,522 | A | 6/1973 | Muehlberger | |
| 4,423,304 | A | 12/1983 | Bass et al. | |
| 4,839,492 | A * | 6/1989 | Bouchier et al. | 219/121.48 |
| 4,877,937 | A * | 10/1989 | Muller | 219/121.59 |
| 4,970,364 | A | 11/1990 | Miiller | |
| D338,142 | S | 8/1993 | Sarkissian | |
| 5,837,959 | A | 11/1998 | Muehlberger et al. | |
| 6,114,649 | A | 9/2000 | Delcea | |
| 6,262,386 | B1 | 7/2001 | Fornsel | |
| 6,353,200 | B1 * | 3/2002 | Schwankhart | 219/121.46 |
| 6,657,152 | B2 * | 12/2003 | Shimazu | 219/121.47 |
| 6,744,006 | B2 * | 6/2004 | Johnson et al. | 219/121.51 |
| 8,624,150 | B2 * | 1/2014 | Simek et al. | 219/121.53 |
| 2004/0140295 | A1 * | 7/2004 | Herres | 219/121.5 |
| 2013/0193118 | A1 | 8/2013 | Severance, Jr. et al. | |
| 2014/0138360 | A1 * | 5/2014 | Hansen et al. | 219/121.44 |

FOREIGN PATENT DOCUMENTS

| | | | |
|---|---|---|---|
| EP | 0634887 | A1 | 1/1995 |
| FR | 2672459 | A1 | 8/1992 |

OTHER PUBLICATIONS

International Search Report for International Application No. PCT/US2013/051989 dated Jan. 23, 2014 4 pages.

* cited by examiner

*Primary Examiner* — Mark Paschall
(74) *Attorney, Agent, or Firm* — Proskauer Rose LLP

(57) ABSTRACT

A consumable set is provided that is usable in a plasma arc torch to direct a plasma arc to a processing surface of a workpiece. The consumable set includes a nozzle having: 1) a nozzle body defining a longitudinal axis extending therethrough, and 2) a nozzle exit orifice, disposed in the nozzle body, for constricting the plasma arc. The nozzle exit orifice defines an exit orifice axis oriented at a non-zero angle relative to the longitudinal axis. The consumable set can also include an alignment surface generally parallel to the exit orifice axis. The alignment surface is dimensioned to align the exit orifice such that the plasma arc impinges orthogonally on the processing surface.

35 Claims, 6 Drawing Sheets

ASYMMETRIC CONSUMABLES FOR A PLASMA ARC TORCH

FIELD OF THE INVENTION

The present invention relates generally to one or more asymmetric consumables usable in a plasma arc torch to cut a surface of a workpiece with at least one internal corner.

BACKGROUND OF THE INVENTION

Thermal processing torches, such as plasma arc torches, are widely used in the heating, cutting, gouging and marking of materials. A plasma arc torch generally includes an electrode, a nozzle having a central exit orifice mounted within a torch body, electrical connections, passages for cooling, and passages for arc control fluids (e.g., plasma gas). Optionally, a swirl ring is employed to control fluid flow patterns in the plasma chamber formed between the electrode and the nozzle. In some torches, a retaining cap can be used to maintain the nozzle and/or swirl ring in the plasma arc torch. In operation, the torch produces a plasma arc, which is a constricted jet of an ionized gas with high temperature and sufficient momentum to assist with removal of molten metal.

A problem with existing plasma arc torches, including handheld plasma arc torches, is that they have difficulties flush cutting a workpiece having one or more internal corners due to the axial configuration of the torches. As shown in FIG. 1, a conventional plasma arc torch 100, which includes a rotational symmetric torch tip 102, cannot make a flush cut in the workpiece along the desired path 104. Specifically, the plasma arc torch 100 has difficulty cutting off the protruding flange 106 as close as possible against the horizontal surface 107 of the base 108 without cutting below the horizontal surface 107. Instead, the best cut achievable by the plasma arc torch 100 is indicated by the path 110. As a result, secondary operations, such as grinding, are required to remove the excess workpiece section 112 to achieve the desired flush cut 104. In addition, the closer the plasma arc torch 100 directs a plasma arc flow to the corner of the workpiece, the more likely the arc can inadvertently damage the base 108, such as extending the cut below the horizontal surface 107 of the base 108 along the path 114. Yet another limitation of the plasma arc torch 100 is its inability to ensure that a cut in a workpiece corner is consistently reproducible. For example, the plasma arc torch 100 does not have any positioning mechanism to ensure that the same cut can be made at the same relative location in the corners of different workpieces.

SUMMARY OF THE INVENTION

Thus, systems and methods are needed to perform flush cutting operations close to an internal corner of a workpiece while minimizing secondary finishing and avoid inflicting damage to any remaining portions of the workpiece. In addition, systems and methods are needed to ensure that cuts are repeatable and reproducible. These systems and methods can be used in many industrial applications, such as to perform flush cutting in a cargo trailer or ship hull having many internal compartments.

In one aspect, a consumable set is provided that is usable in a plasma arc torch to direct a plasma arc to a processing surface of a workpiece. The consumable set includes a nozzle having: 1) a nozzle body defining a longitudinal axis extending therethrough, and 2) a nozzle exit orifice, disposed in the nozzle body, for constricting the plasma arc. The nozzle exit orifice defines an exit orifice axis oriented at a non-zero angle relative to the longitudinal axis. The consumable set also includes an alignment surface generally parallel to the exit orifice axis. The alignment surface is dimensioned to align the exit orifice such that the plasma arc impinges orthogonally on the processing surface.

In some embodiments, the alignment surface is configured to lay at least substantially flush against a guiding surface that is angled relative to the processing surface of the workpiece. The guiding surface can be a portion of a template attachable to the workpiece or the plasma arc torch. In some embodiments, the alignment surface is parallel to the exit orifice axis. The alignment surface can also be within about 10 degrees from being parallel to the exit orifice axis.

In some embodiments, the consumable set further includes a second alignment surface angled relative to the alignment surface. The second alignment surface, in cooperation with the alignment surface, aligns the plasma arc to impinge orthogonally on the processing surface. The consumable set can also include a curved surface for interconnecting the alignment surface and the second alignment surface. The second alignment surface can be configured to contact the processing surface. At least one of the alignment surface or the second alignment surface can be located on an external surface of a nozzle.

In some embodiments, the consumable set includes a third alignment surface angled relative to the alignment surface and the second alignment surface. The third alignment surface, in cooperation with the alignment surface and the second alignment surface, aligns the plasma arc to impinge orthogonally on the processing surface. The third alignment surface can be configured to contact a second guiding surface angled relative to the guiding surface and the processing surface of the workpiece.

In some embodiments, the consumable set further includes a shield having at least one of the alignment surface, the second alignment surface or the third alignment surface.

In some embodiments, the alignment surface includes a rounded portion. The nozzle exit orifice can define an interior opening and an exterior opening along the exit orifice axis. For such a configuration, the distance from a first point on a geometric arc defined by the rounded portion of the alignment surface to the center of the exterior opening of the nozzle exit orifice is at least substantially equal to the distance from a second point on the geometric arc of the rounded portion of the alignment surface to the center of the exterior opening of the nozzle exit orifice. The center of the exterior opening of the nozzle exit orifice can be less than about 0.25 inches from the alignment surface. The exterior opening of the nozzle exit orifice can be located on the second alignment surface angled relative to the alignment surface.

In some embodiments, the nozzle exit orifice is curved or straight. In some embodiments, the nozzle or the alignment surface is coated with an electrically insulating material. In some embodiments, the plasma arc torch is a handheld plasma arc torch.

In another aspect, a nozzle for a plasma arc torch is provided. The nozzle includes a nozzle body having 1) a longitudinal axis extending through the nozzle body, 2) an internal structure generally rotationally symmetric about the longitudinal axis, and 3) an external structure rotationally asymmetric about the longitudinal axis. The nozzle includes an exit orifice that passes between the internal structure and the external structure of the nozzle body for constricting a plasma arc through the exit orifice. The exit orifice is rotationally asymmetric about the longitudinal axis. The nozzle also includes an alignment surface located on the external structure of the nozzle body for guiding the plasma arc to a location of a processing surface of a workpiece.

In some embodiments, the exit orifice of the nozzle defines an exit orifice axis generally parallel to the alignment surface. In some embodiments, the exit orifice axis is oriented at a non-zero angle relative to the longitudinal axis extending through the nozzle body.

In some embodiments, the nozzle further includes a second alignment surface located on the external structure of the nozzle body. The second alignment surface is adapted to contact the processing surface of the workpiece.

In some embodiments, the alignment surface of the nozzle is adapted to contact a guiding surface that guides the plasma arc to impinge on the processing surface. The processing surface of the workpiece can be relatively angled from the guiding surface. For example, the processing surface and the guiding surface can be perpendicular to each other and the plasma arc can impinge orthogonally on the processing surface. In some embodiments, the alignment surface includes a rounded portion.

In another aspect, a torch tip for a handheld plasma arc torch is provided. The torch tip includes a nozzle for generating a plasma arc. The nozzle can include a nozzle body, The torch tip further includes a plasma arc exit orifice located in the nozzle body for constricting the plasma arc. The plasma arc exit orifice defines an exit orifice axis. The torch tip also includes a first portion and a second portion segmented by a plane intersecting the exit orifice axis. The first portion has a smaller volume than the second portion. The torch tip further includes an alignment surface located on an outer surface of the first portion of the torch tip to guide the plasma arc to impinge orthogonally on a processing surface of a workpiece. The distance between the exit orifice axis and the alignment surface can be less than 0.5 inches, less than 0.25 inches or less than 0.125 inches.

In some embodiments, the exit orifice axis is located at a non-zero angle from a longitudinal axis extending through the nozzle body.

In some embodiments, the torch tip includes a second alignment surface located on an outer surface of the second portion of the torch tip. The second alignment surface is configured to contact the processing surface of the workpiece. In some embodiments, the first portion of the torch tip is about ⅓ or less of the volume of the second portion.

In another aspect, a method of manufacturing a consumable set is provided that is usable in a plasma arc torch for directing a plasma arc to a processing surface of a workpiece. The method includes fabricating a nozzle body having a longitudinal axis extending therethrough and forming a nozzle exit orifice in the nozzle body oriented at a non-zero angle relative to the longitudinal axis of the nozzle body. The nozzle exit orifice is dimensioned to constrict the plasma arc passing therethrough. The method further includes locating an alignment surface on the nozzle body that is generally parallel to the nozzle exit orifice axis. The alignment surface is dimensioned to align the plasma arc exiting the nozzle exit orifice to impinge orthogonally on the processing surface.

In some embodiments, the method further includes fabricating a shield including: 1) the alignment surface and 2) a shield exit orifice coplanar with the nozzle exit orifice for delivering the plasma arc to impinge on the processing surface of the workpiece.

It should also be understood that various aspects and embodiments of the invention can be combined in various ways. Based on the teachings of this specification, a person of ordinary skill in the art can readily determine how to combine these various embodiments. For example, in some embodiments, any of the aspects above can include one or more of the above features. One embodiment of the invention can provide all of the above features and advantages.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

Figure 1:
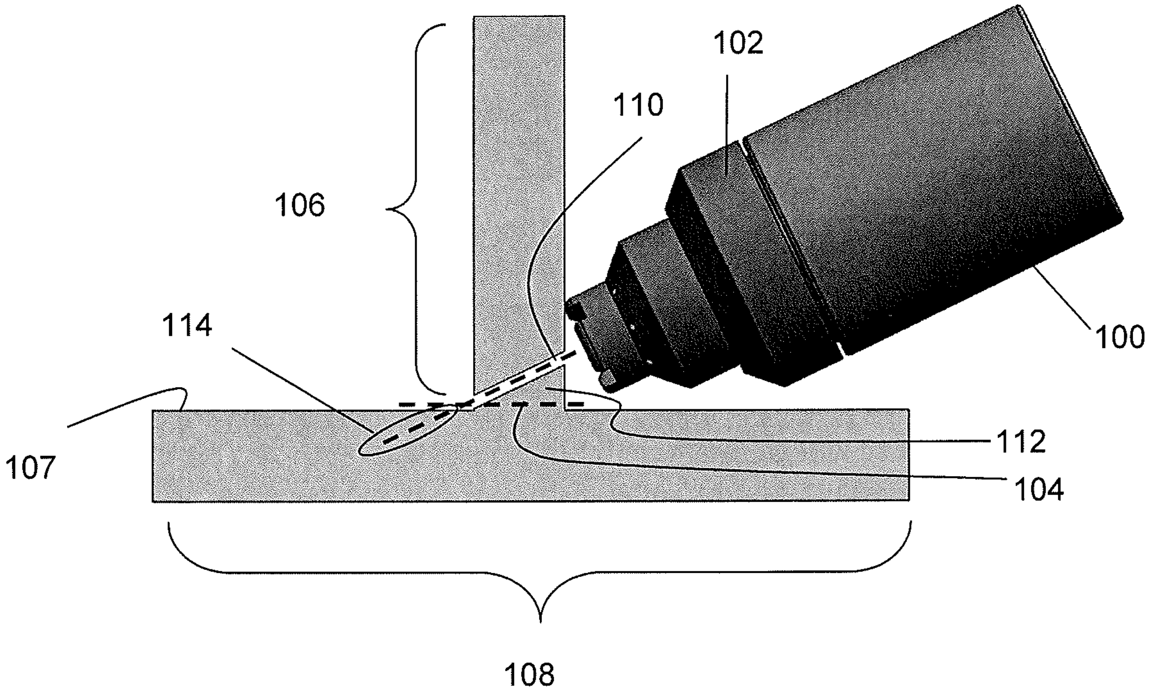
FIG. 1 (Prior Art)
FIG. 1 shows a prior art plasma arc torch for cutting a workpiece.
Figure 2:
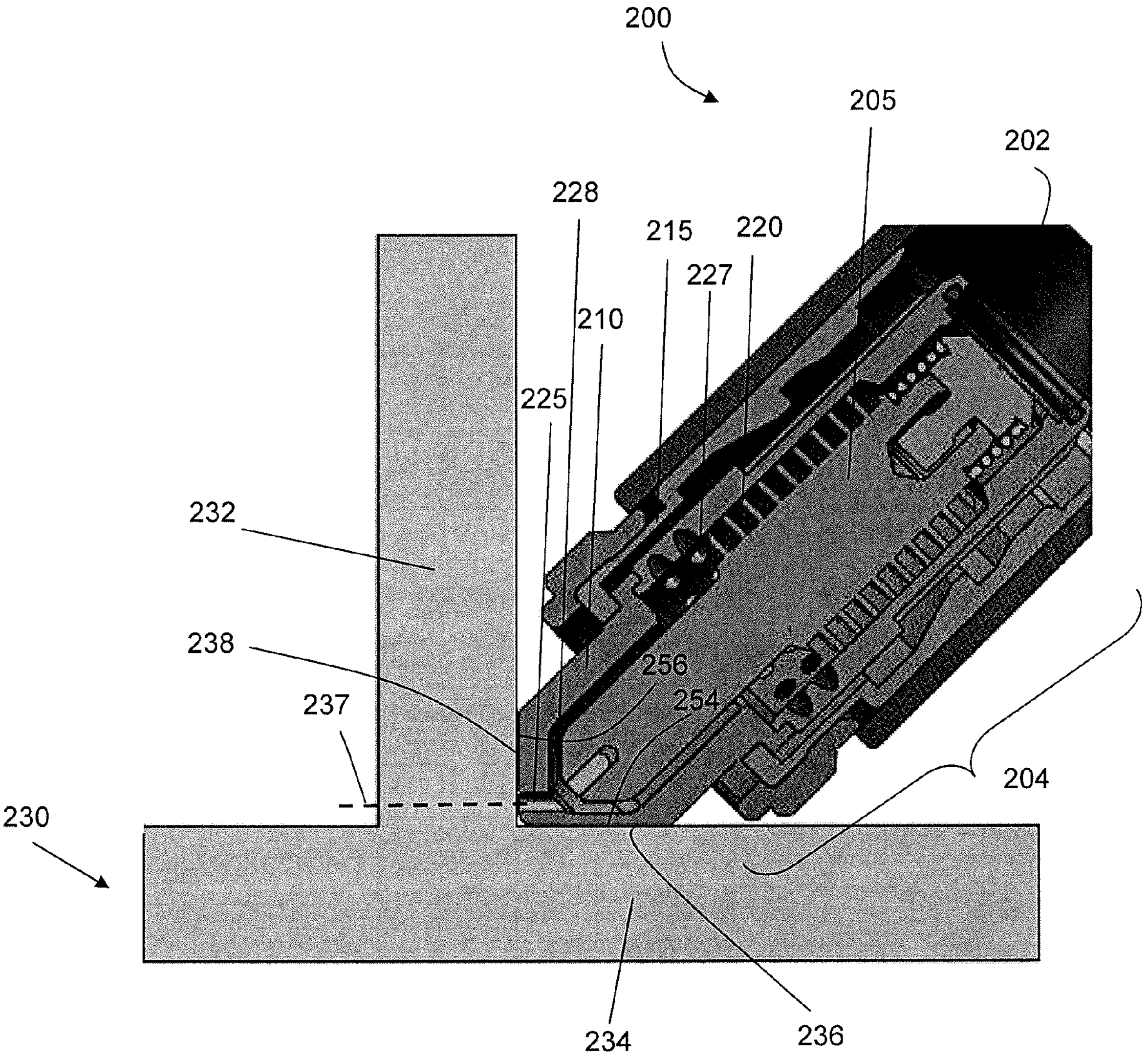
FIG. 2 shows an exemplary plasma arc torch for cutting a workpiece according to some embodiments of the present invention.

FIG. 2 shows an exemplary plasma arc torch 200 for cutting a workpiece according to some embodiments of the present invention. The plasma arc torch 200 includes a torch body 202 and a torch tip 204. The torch tip 204 includes multiple consumables, for example, an electrode 205, a nozzle 210, a retaining cap 215 and a swirl ring 220. The torch tip 204 can also include a shield (not shown). The torch body 202, which has a generally cylindrical shape, supports the electrode 205 and the nozzle 210. The nozzle 210 is spaced from the electrode 205 and has a central exit orifice 225 mounted within the torch body 202. The swirl ring 220 is mounted to the torch body 202 and has a set of radially offset or canted gas distribution holes 227 that impart a tangential velocity component to the plasma gas flow, causing the plasma gas flow to swirl. If a shield is present, the shield includes a shield exit orifice and is connected (e.g., threaded) to the retaining cap 215. The retaining cap 215 as shown is an inner retaining cap securely connected (e.g., threaded) to the torch body 202. In some embodiments, an outer retaining cap (not shown) is secured relative to the shield. The torch 200 can additionally include electrical connections, passages for cooling, passages for arc control fluids (e.g., plasma gas), and a power supply. In some embodiments, the consumables include a welding tip, which is a nozzle for passing an ignited welding gas.

In operation, a plasma gas flows through a gas inlet tube (not shown) and the gas distribution holes 227 in the swirl ring 220. From there, the plasma gas flows into a plasma chamber 228 and out of the torch 200 through the exit orifice 225 of the nozzle 210 that constricts the plasma gas flow. A pilot arc is first generated between the electrode 205 and the nozzle 210. The pilot arc ionizes the gas passing through the nozzle exit orifice 225. The arc then transfers from the nozzle 210 to a workpiece 230 for thermally processing (e.g., cutting or welding) the workpiece 230. In some embodiments, the nozzle 210 is suitably configured to be positioned as close as possible to an inner corner of the workpiece 230 created by a protruding flange 232 and a horizontal portion 234. The nozzle 210 can guide a plasma gas flow through the exit orifice 225 such that the plasma gas impinges orthogonally on the flange 232 as the plasma gas exits from the orifice 225, thereby cutting the flange 232 from the workpiece 230 along the path 237. It is noted that the illustrated details of the torch 200, including the arrangement of the components, the direction of gas and cooling fluid flows, and the electrical connections, can take a variety of forms. In addition, even though the flange 232 and the horizontal portion 234 of the inner corner are illustrated as being perpendicular to each other, the two portions of the workpiece 230 can be oriented at any angle and the nozzle 210 can be suitably configured to perform flush cutting in the resulting inner corner.

Figure 3A:
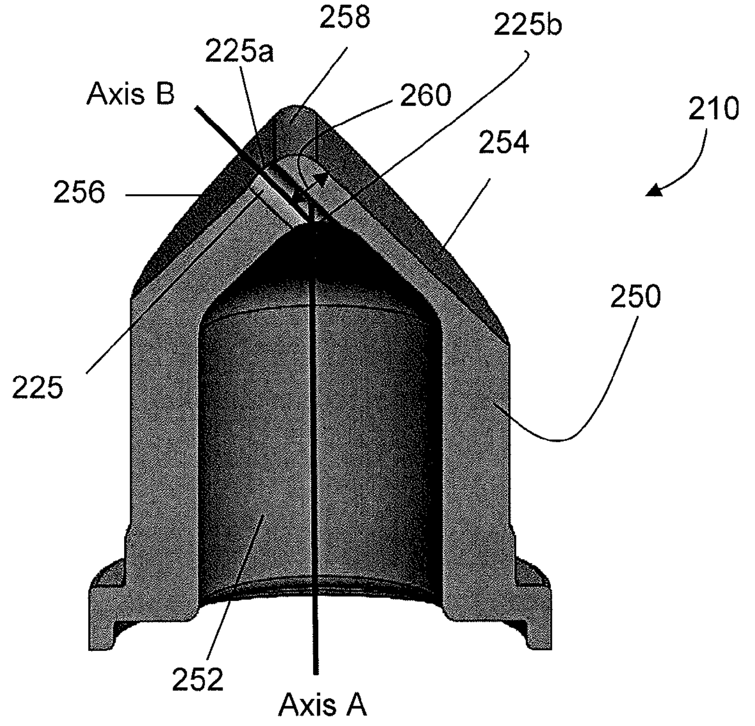
FIGS. 3A-3B show various perspectives of an exemplary nozzle configuration.
Figure 3B:
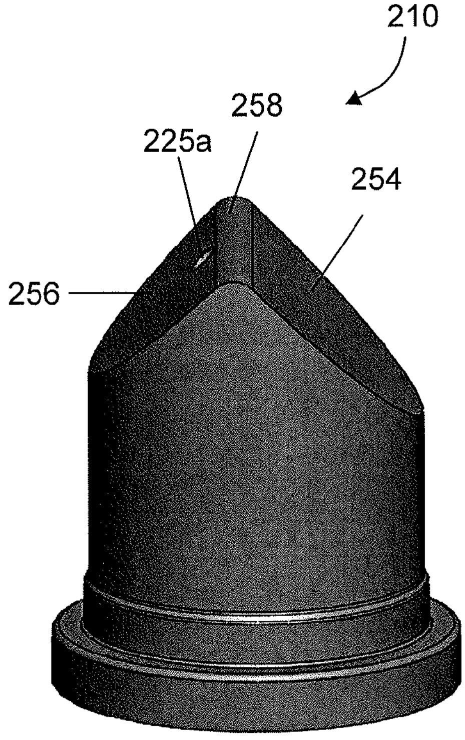

FIGS. 3A and 3B show various perspectives of an exemplary configuration of the nozzle 210 designed to facilitate inner-corner flush cutting operations. The nozzle 210 includes a nozzle body 250 defining a longitudinal axis A extending therethrough. An interior surface 252 of the nozzle 210 can be rotationally symmetrical about the longitudinal axis A while the exterior of the nozzle body 250 can be rotationally asymmetric about the longitudinal axis A. The nozzle exit orifice 225, disposed in the nozzle body 210, defines an exit orifice axis B extending longitudinally along the length of the nozzle exit orifice 225 from an interior opening 225*b* to an exterior opening 225*a*. The exit orifice axis B can be oriented at a non-zero angle relative to the longitudinal axis A. That is, the nozzle exit orifice 225 can be rotationally asymmetric about the longitudinal axis A. The nozzle exit orifice 225 is configured to introduce a plasma arc flow from the interior opening 225*b*, which is in fluid communication with the interior surface 252 of the nozzle 210, to a workpiece through the exterior opening 225*a*. Even though the nozzle exit orifice 225 is shown as being substantially straight, in other embodiments, the nozzle exit orifice 225 can be curved or have a sequence of non-parallel segments.

In addition, the nozzle 210 includes an alignment surface 254 disposed on the exterior surface of the nozzle body 250. The alignment surface 254 can be generally parallel to the exit orifice axis B, such as exactly parallel to the exit orifice axis B or within about 10 degrees from being parallel to the exit orifice axis B. During torch operation, the alignment surface 254 is dimensioned to lay substantially flush against a guiding surface 236 on the horizontal portion 234 of the workpiece 230, which is a surface that is not being cut by the plasma arc and is used instead to guide and/or position the torch for enhanced flush cutting of the flange 232. Specifically, the alignment surface 254 of the nozzle 210, upon being laid upon the guiding surface 236 of the horizontal portion 234, aligns the external end 225*a* of the nozzle exit orifice 225 against the processing surface 238 of the flange 232 such that a plasma arc impinges orthogonally onto the processing surface 238 and into the flange 232 along the cut path 237. As shown in FIG. 2, the processing surface 238 and the guiding surface 236 of the workpiece 230 are angled relative to each other to form the inner corner of the workpiece 230. Even though the guiding surface 236 is illustrated as a portion of the workpiece 234, in other embodiments, the guiding surface 236 is a portion of a separate template (not shown) used to guide the torch 200 into position. For example, the separate template, which includes the guiding surface 236, can be attached to the torch 200 and/or the workpiece 234 for positioning the torch 200 to perform flush cutting.

In some embodiments, a distance 260 between the center of the exterior opening 225*a* of the nozzle exit orifice 225 and the alignment surface 254 is less than or equal to about 0.5 inches, 0.25 inches, or 0.1 inches. This distance controls how close the cut path 237 is to the horizontal portion 234 of the workpiece 230. Hence, the smaller the distance 260, the closer the plasma arc torch cuts to the base of the flange 232 from the horizontal portion 234.

In addition to the alignment surface 254, the nozzle 210 can also include a second alignment surface 256 angled relative to the alignment surface 254 and a curved surface 258 that interconnects the two alignment surfaces. During torch operation, the second alignment surface 256, in cooperation with the alignment surface 254, enhances orthogonal impingement of the plasma arc against the processing surface 238 of the flange 232. For example, the second alignment surface 256 can be oriented at an angle from the alignment surface 254 such that the second alignment surface 256 lays substantially flush against the processing surface 238 of the flange 232 while the alignment surface 254 lays substantially flush against the guiding surface 236 of the horizontal portion 234. In addition, the curved surface 258 of the nozzle 210 is configured to inter-fit within the corner created by the processing surface 238 and the guiding surface 236 of the workpiece 230. The two alignment surfaces of the nozzle 210 ensure that the plasma arc torch is positioned tightly and securely into the inner corner of the workpiece 230 while a plasma arc is delivered to the processing surface 238 by the torch 200 via the exterior opening 225*a* of the nozzle exit orifice 225. As shown in FIG. 2, the exterior opening 225*a* of the nozzle exit orifice 225 is located on the second alignment surface 256 of the nozzle 210.

In some embodiments, the first alignment surface 254 and the second alignment surface 256 are substantially perpendicular to each other such that the nozzle 210 can be securely positioned into an inner corner of about 90 degrees. In other embodiments, nozzles with different angles between the alignment surfaces (e.g., 60 degrees, 30 degrees and 15 degrees) can be constructed such that an operator can choose the most appropriate nozzle to perform flush cutting in view of the angle of a given inner corner. In some embodiments, the angle between the first alignment surface 254 and the second alignment surface 256 of a nozzle 210 is adjustable, such that the operator can adjust one or both of the alignment surfaces to produce a secure fit of the nozzle 210 into any given corner of a workpiece. For example, adjustments can be made such that both of the alignment surfaces of the nozzle 210 can contact respect processing surface 238 and guiding surface 236 of the workpiece 230 during a cutting operation.

Figure 4:
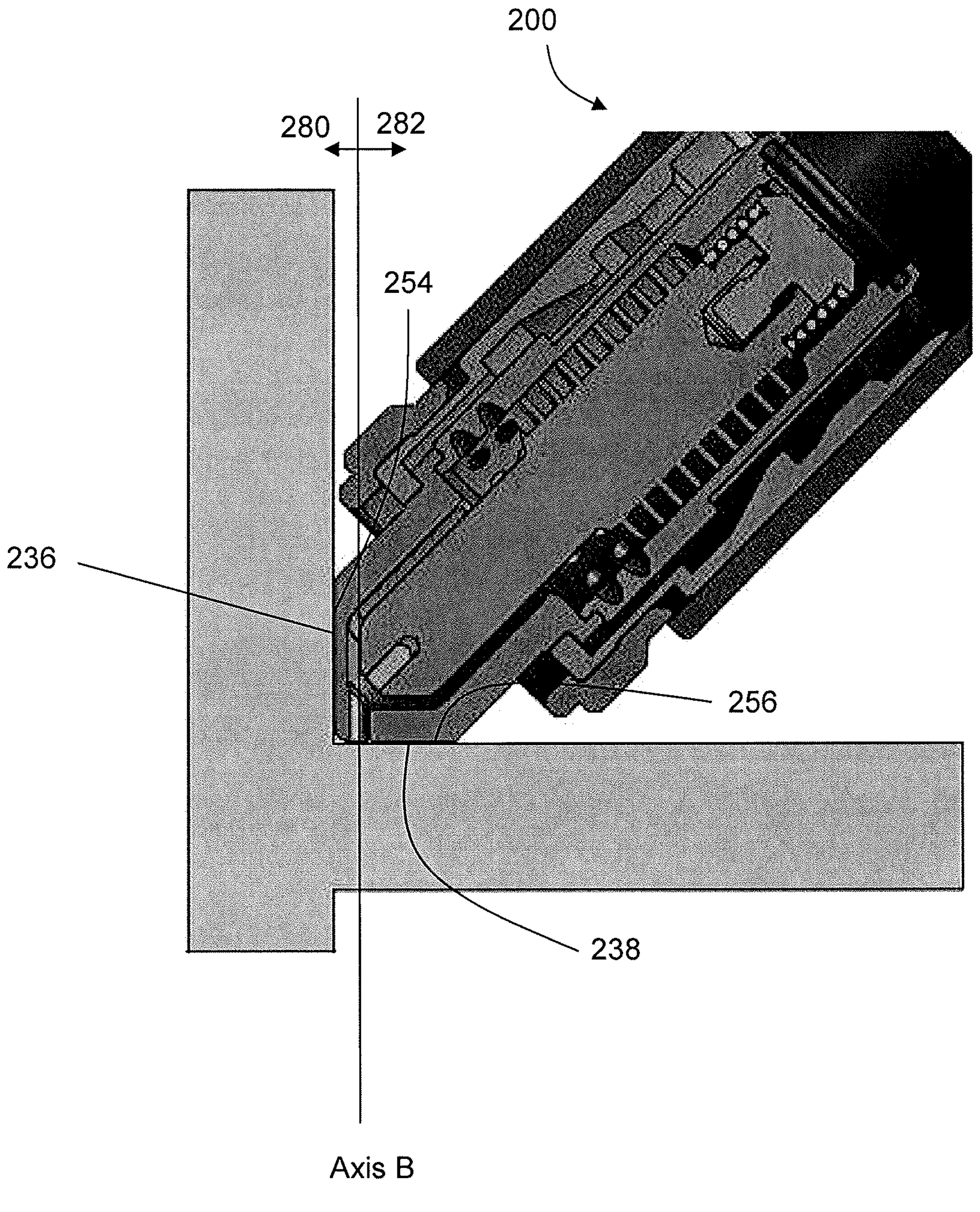
FIG. 4 shows another perspective of the exemplary nozzle of FIGS. 3A-B.

Another approach for illustrating the asymmetric nature of the nozzle 210 is shown in FIG. 4. A plane can be defined to include the exit orifice axis B, thereby segmenting the nozzle 210 into two portions: 1) a first, smaller portion 280 on one side of plane and 2) a second, larger portion 282 on the other side of the plane. The alignment surface 254 of the nozzle 210 is located on the external surface of the first portion 280 and can contact the guiding surface 236 of the workpiece once the torch 200 is positioned into the inner corner of the workpiece. The second alignment surface 256 is located on the external surface of the second portion 282 and can contact the processing surface 238 of the workpiece during a cutting operation. The first portion 280 can be about ⅓, ¼, or ⅕ of the volume of the second portion 282.

Figure 5:
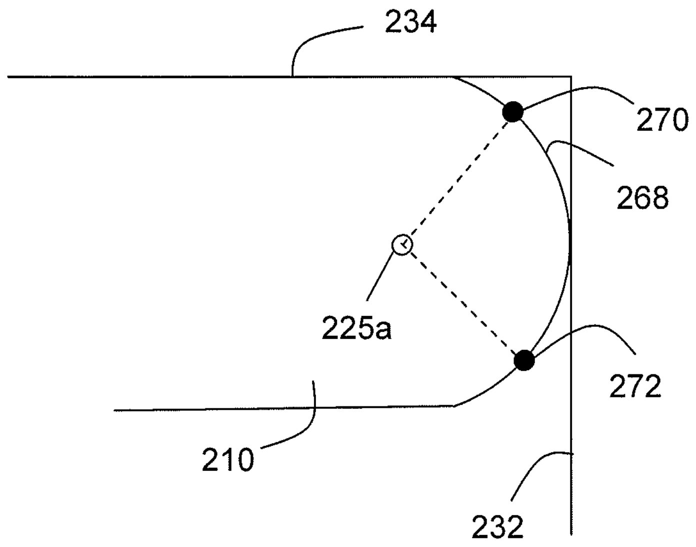
FIG. 5 shows an exemplary alignment surface of the nozzle of FIGS. 3A-B.

In some embodiments, the contour of the alignment surface 254 of the nozzle 210 has at least a rounded-arc portion 268, as shown from atop view of the nozzle 210 in FIG. 5. The rounded-arc portion 268 can be positioned in an inner corner created by the intersection of a horizontal portion 234 and a flange 232 of a workpiece 230. The distance from a first point 270 on the rounded-arc portion 268 to the center of the exterior opening 225*a* of the nozzle exit orifice 255 is at least substantially equal to the distance from a second point 272 on the rounded-arc portion 268 to the center of the exterior opening 225*a*. The exterior opening 225*a* can be located on a second alignment surface 256 of the nozzle 210. Such equidistance configuration ensures that an operator of the plasma arc torch can predict the location on the workpiece to which a plasma arc would be delivered prior to initiating the plasma arc operation, thereby allowing the cutting operation to be repeatable and predictable. In some embodiments, the second alignment surface 256 is designed to include a similar rounded-arc portion.

Figure 6A:
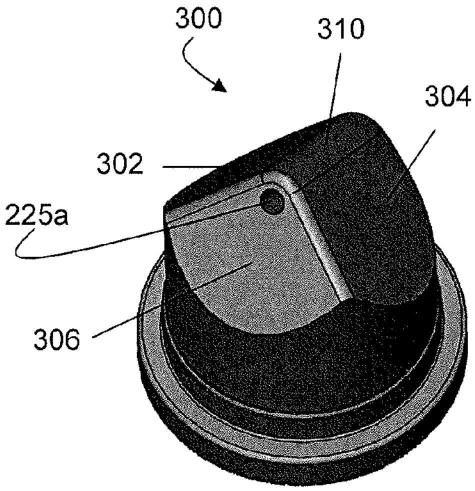
FIGS. 6A-C show various perspectives of another exemplary nozzle configuration.
Figure 6B:
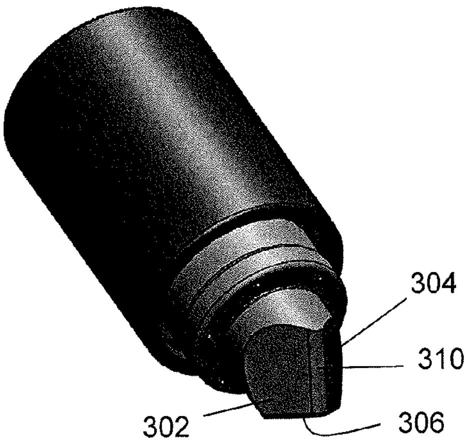
Figure 6C:
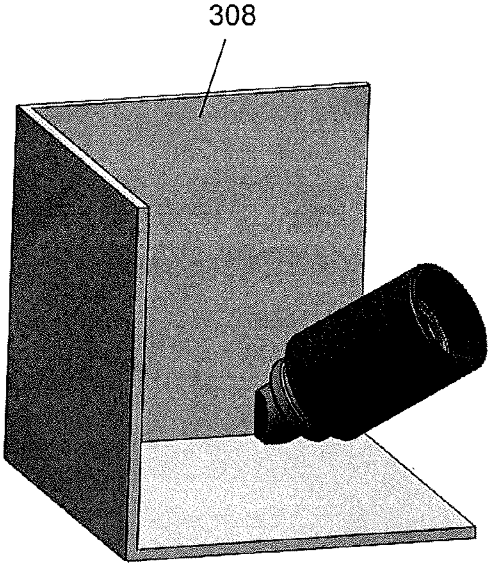

FIGS. 6A-C show various perspectives of another exemplary nozzle 300 that includes three alignment surfaces. Specifically, the nozzle 300 includes i) an alignment surface 302, ii) a second alignment surface 304 angled relative to the alignment surface 302, iii) a third alignment surface 306 angled relative to the alignment surface 302 and the second alignment surface 304; and iv) one or more curved surfaces 310 connecting the three alignment surfaces. The nozzle 300 is configured to perform flush cutting in relation to an inner corner of a workpiece 308 constructed from three surfaces, with the surface being cut referred to as the processing surface and the remaining two surfaces referred to as the guiding surfaces. In other embodiments, the guiding surfaces are disposed on one or more separate templates that are attachable to the workpiece 308 and/or the nozzle 300. In operation, the three alignment surfaces of the nozzle 300, in cooperation with each other, align the plasma arc to impinge orthogonally on the processing surface of the workpiece 308. For example, the alignment surfaces 302 and 304 can lay substantially flush against the two guiding surfaces of the workpiece 308 while the alignment surface 306, which includes the exterior opening 225*a* of the nozzle exit orifice 225, lays substantially flush against the processing surface of the workpiece 308. The alignment surfaces of the nozzle 300 ensure that the plasma arc torch is positioned tightly and securely into the inner corner of the workpiece 308 while a plasma arc is delivered to the processing surface of the workpiece 308 via the exterior opening 225*a*. In some embodiments, at least one of the alignment surface 302, the second alignment surface 304, or the third alignment surface 306 has a contour with a rounded-arc portion, similar to the contour illustrated in FIG. 5.

In various embodiments, the asymmetric design described above can be introduced to a plasma arc torch that includes a shield. In some embodiments, the shield can include at least one of the alignment surface 254 or the second alignment surface 256 describe above with respect to the nozzle 210. In alternative embodiments, the shield can include at least one of the alignment surface 302, the second alignment surface 304, or the third alignment surface 306 describe above with respect to the nozzle 300. The asymmetric shield can further include a shield exit orifice coplanar with the nozzle exit orifice for delivering the plasma arc to impinge on a processing surface of a workpiece. The asymmetric shield, upon installation into a plasma arc torch, can provide similar functions as the asymmetric nozzle 210 or 300, such as allowing an operator to securely and tightly position the torch into an inner corner of a workpiece created by two or three workpiece surfaces, while the torch delivers a plasma arc flow to one of the workpiece surfaces. In some embodiments, the contour of at least one of the alignment surfaces of the asymmetric shield has a rounded-arc portion, similar to the contour illustrated in FIG. 5.

In various embodiments, the asymmetric nozzles and/or shields of the present invention can be coated with an electrically insulating material, such as a ceramic coating. The plasma arc torches, including the asymmetric nozzles and/or shields, can be constructed as handheld devices or wearable devices attached to a backpack, front-pack, and/or a shoulder strap mounted pack, for example.

It should also be understood that various aspects and embodiments of the invention can be combined in various ways. Based on the teachings of this specification, a person of ordinary skill in the art can readily determine how to combine these various embodiments. A person of ordinary skill in the art can also readily determine how to manufacture the asymmetric nozzles and/or shields of the present invention. An exemplary manufacturing method can include fabricating the nozzle body 250 having a longitudinal axis A extending therethrough, forming the nozzle exit orifice 225 in the nozzle body 250 that is oriented at a non-zero angle relative to the longitudinal axis A, and locating at least one alignment surface 254 on an external surface of the nozzle body 225. The method can also include fabricating a shield to include one or more of the above-described asymmetric elements. In addition, modifications may occur to those skilled in the art upon reading the specification. The present application includes such modifications and is limited only by the scope of the claims.

What is claimed is:

1. A consumable set usable in a plasma arc torch to direct a plasma arc to a processing surface of a workpiece, the consumable set comprising:

a nozzle including: 1) a nozzle body defining a longitudinal axis extending therethrough, and 2) a nozzle exit orifice, disposed in the nozzle body, for constricting the plasma arc, wherein the nozzle exit orifice defines an exit orifice axis oriented at a non-zero angle relative to the longitudinal axis; and an alignment surface generally parallel to the exit orifice axis, the alignment surface being dimensioned to align the exit orifice such that the plasma arc impinges orthogonally on the processing surface of the workpiece, wherein (i) the alignment surface is configured to lay at least substantially flush against a guiding surface angled relative to the processing surface of the workpiece and (ii) the longitudinal axis of the nozzle body is oriented at an acute angle relative to the alignment surface.

2. The consumable set of claim 1, further comprising a second alignment surface angled relative to the alignment surface, wherein the second alignment surface, in cooperation with the alignment surface, aligns the plasma arc to impinge orthogonally on the processing surface.

3. The consumable set of claim 2, further comprising a curved surface for interconnecting the alignment surface and the second alignment surface.

4. The consumable set of claim 2, wherein the second alignment surface is configured to contact the processing surface.

5. The consumable set of claim 1, wherein the nozzle exit orifice defines an interior opening and an exterior opening along the exit orifice axis.

6. The consumable set of claim 5, wherein the alignment surface includes a rounded portion.

7. The consumable set of claim 6, wherein the distance from a first point on a geometric arc defined by the rounded portion of the alignment surface to the center of the exterior opening of the nozzle exit orifice is at least substantially equal to the distance from a second point on the geometric arc of the rounded portion of the alignment surface to the center of the exterior opening of the nozzle exit orifice.

8. The consumable set of claim 5, wherein the center of the exterior opening of the nozzle exit orifice is less than about 0.25 inches from the alignment surface.

9. The consumable set of claim 5, wherein the exterior opening of the nozzle exit orifice is located on a second alignment surface angled relative to the alignment surface.

10. The consumable set of claim 1, wherein the nozzle exit orifice is curved or straight.

11. The consumable set of claim 2, wherein at least one of the alignment surface or the second alignment surface is located on an external surface of the nozzle.

12. The consumable set of claim 1, wherein the nozzle or the alignment surface is coated with an electrically insulating material.

13. The consumable set of claim 2, further comprising a shield including at least one of the alignment surface or the second alignment surface.

14. The consumable set of claim 1, wherein the plasma arc torch is a handheld plasma arc torch.

15. The consumable set of claim 1, wherein the alignment surface being generally parallel to the exit orifice axis comprises the alignment surface being parallel to the exit orifice axis.

16. The consumable set of claim 1, wherein the alignment surface being generally parallel to the exit orifice axis comprises the alignment surface within about 10 degrees from being parallel to the exit orifice axis.

17. The consumable set of claim 2, further comprising a third alignment surface angled relative to the alignment surface and the second alignment surface, wherein the third alignment surface, in cooperation with the alignment surface and the second alignment surface, aligns the plasma arc to impinge orthogonally on the processing surface.

18. The consumable set of claim 17, wherein the third alignment surface is configured to contact a second guiding surface angled relative to the guiding surface and the processing surface of the workpiece.

19. A nozzle for a plasma arc torch, the nozzle comprising:

a nozzle body including: 1) a longitudinal axis extending through the nozzle body, 2) an internal structure generally rotationally symmetric about the longitudinal axis, and 3) an external structure rotationally asymmetric about the longitudinal axis;

an exit orifice passing between the internal structure and the external structure of the nozzle body for constricting a plasma arc through the exit orifice, wherein the exit orifice is rotationally asymmetric about the longitudinal axis; and an alignment surface located on the external structure of the nozzle body for guiding the plasma arc to a location of a processing surface of a workpiece such that the plasma arc impinges orthogonally on the processing surface of the workpiece, wherein (i) the alignment surface is configured to lay at least substantially flush against a guiding surface angled relative to the processing surface of the workpiece and (ii) the longitudinal axis of the nozzle body is oriented at an acute angle relative to the alignment surface.

20. The nozzle of claim 19, wherein the exit orifice defines an exit orifice axis generally parallel to the alignment surface.

21. The nozzle of claim 20, wherein the exit orifice axis is oriented at a non-zero angle relative to the longitudinal axis.

22. The nozzle of claim 19, further comprising a second alignment surface located on the external structure of the nozzle body, wherein the second alignment surface is adapted to contact the processing surface.

23. The nozzle of claim 19, wherein the alignment surface is adapted to contact a guiding surface to guide the plasma arc to impinge on the processing surface of the workpiece.

24. The nozzle of claim 23, wherein the processing surface is relatively angled from the guiding surface.

25. The nozzle of claim 24, wherein the processing surface and the guiding surface are perpendicular to each other and the plasma arc is adapted to impinge orthogonally on the processing surface.

26. The nozzle of claim 19, wherein the alignment surface includes a rounded portion.

27. A torch tip for a handheld plasma arc torch including a nozzle, the nozzle including a nozzle body, for generating a plasma arc, the torch tip comprising:

a plasma arc exit orifice located in the nozzle body for constricting the plasma arc, the plasma arc exit orifice defining an exit orifice axis;

a first portion and a second portion segmented by a plane intersecting the exit orifice axis, the first portion having a smaller volume than the second portion; and an alignment surface located on an outer surface of the first portion of the torch tip to guide the plasma arc to impinge orthogonally on a processing surface of a workpiece, wherein (i) the alignment surface is configured to lay at least substantially flush against a guiding surface angled relative to the processing surface of the workpiece and (ii) the longitudinal axis of the nozzle body is oriented at an acute angle relative to the alignment surface.

28. The torch tip of claim 27, wherein the exit orifice axis is located at a non-zero angle from a longitudinal axis extending through the nozzle body.

29. The torch tip of claim 27, wherein the distance between the exit orifice axis and the alignment surface is less than 0.5 inches.

30. The torch tip of claim 27, wherein the distance between the exit orifice axis and the alignment surface is less than 0.25 inches.

31. The torch tip of claim 27, wherein the distance between the exit orifice axis and the alignment surface is less than 0.125 inches.

32. The torch tip of claim 27, further comprising a second alignment surface located on an outer surface of the second portion of the torch tip, wherein the second alignment surface is configured to contact the processing surface.

33. The torch tip of claim 27, wherein the first portion is about ⅓ or less of the volume of the second portion.

34. A method of manufacturing a consumable set usable in a plasma arc torch for directing a plasma arc to a processing surface of a workpiece, the method comprising:

fabricating a nozzle body having a longitudinal axis extending therethrough;

forming a nozzle exit orifice in the nozzle body oriented at a non-zero angle relative to the longitudinal axis of the nozzle body, the nozzle exit orifice dimensioned to constrict the plasma arc passing therethrough; and locating an alignment surface on the nozzle body that is generally parallel to the nozzle exit orifice axis, the alignment surface being dimensioned to align the plasma arc exiting the nozzle exit orifice to impinge orthogonally on the processing surface, wherein (i) the alignment surface is configured to lay at least substantially flush against a guiding surface angled relative to the processing surface of the workpiece and (ii) the longitudinal axis of the nozzle body is oriented at an acute angle relative to the alignment surface.

35. The method of claim 34, further comprising fabricating a shield including: 1) the alignment surface and 2) a shield exit orifice coplanar with the nozzle exit orifice for delivering the plasma arc to impinge on the processing surface.

* * * * *